US010097297B2

(12) United States Patent
Yang et al.

(10) Patent No.: US 10,097,297 B2
(45) Date of Patent: Oct. 9, 2018

(54) APPARATUS AND METHOD FOR TWO-WAY TIMESTAMP EXCHANGE

(71) Applicant: Telefonaktiebolaget L M Ericsson (publ), Stockholm (SE)

(72) Inventors: Qingfeng Yang, Beijing (CN); Guoliang Gao, Beijing (CN); Jun Wang, Beijing (CN)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 84 days.

(21) Appl. No.: 14/903,666

(22) PCT Filed: Jul. 11, 2013

(86) PCT No.: PCT/CN2013/079197
§ 371 (c)(1),
(2) Date: Jan. 8, 2016

(87) PCT Pub. No.: WO2015/003359
PCT Pub. Date: Jan. 15, 2015

(65) Prior Publication Data
US 2016/0173216 A1  Jun. 16, 2016

(51) Int. Cl.
*H04J 3/06* (2006.01)
*H04L 12/707* (2013.01)

(52) U.S. Cl.
CPC ............ *H04J 3/0667* (2013.01); *H04L 45/24* (2013.01)

(58) Field of Classification Search
CPC ............................. H04J 3/0667; H04L 45/24
USPC .................... 370/241–253, 503–520
See application file for complete search history.

(56) References Cited

U.S. PATENT DOCUMENTS

| 8,954,609 B1* | 2/2015 | Holleman | H04J 3/0667 |
| | | | 709/203 |
| 2013/0223458 A1* | 8/2013 | Bui | H04J 3/0667 |
| | | | 370/503 |
| 2014/0241147 A1* | 8/2014 | Rajagopalan | H04L 45/245 |
| | | | 370/221 |

FOREIGN PATENT DOCUMENTS

| CN | 101547083 A | 9/2009 |
| CN | 102655463 A | 9/2012 |
| CN | 102685007 A | 9/2012 |
| EP | 2 661 048 A1 | 11/2013 |

OTHER PUBLICATIONS

International Search Report for International application No. PCT/CN2013/079197, dated Apr. 22, 2014.
IEEE Standard for a Precision Clock Synchronization Protocol for Networked Measurement and Control Systems; IEEE Instrumentation and Measurement Society; Sponsored by the Technical Committee on Sensor Technology (TC-9); IEEE Std 1588 2008, Jul. 24, 2008.

(Continued)

*Primary Examiner* — Christine Ng
(74) *Attorney, Agent, or Firm* — Baker Botts, LLP

(57) ABSTRACT

A method in a first network entity, which is capable of communicating over a plurality of communication links with a second network entity using a two-way timestamp exchange, comprises the step of receiving at the first network entity a first message from the second network entity. The link on which the first message was received is determined. Based on the determination of the link, a second message is transmitted from the first network entity to the second network entity on the same link.

20 Claims, 8 Drawing Sheets

(56) References Cited

OTHER PUBLICATIONS

IEEE Std 802.3ad-2000; Information technology—Telecommunications and information exchange between systems—Local and metropolitan area networks—Specific requirements; Amendment to Carrier Sense Multiple Access with Collision Detection (CSMA/CD) Access Method and Physical Layer Specifications—Aggregation of Multiple Link Segments; Sponsor: LAN MAN Standards Committee of the IEEE Computer Society, Mar. 30, 2000.
802.1AXbq—Link Aggregation Amendment: Distributed Resilient Network Interconnect, Jan. 24, 2014.
Multiprotocol Label Switching Architecture by E. Rosen et al,; Network Working Group; Request for Comments: 3031; Category: Standards Track, Jan. 2001.
Multi-Path Time Synchronization; Network Working Group by A. Shpiner et al.; Intended status: Experimental; Expires: Apr. 2013; server date Oct. 15, 2012; downloaded by EPO on Oct. 16, 2012-Oct. 15, 2012.
Extended European Search Report for Application No. 13 888 993.6-1875/ 3020156 / PCT/CN2013079197 dated Feb. 3, 2017.

* cited by examiner

US 10,097,297 B2

APPARATUS AND METHOD FOR TWO-WAY TIMESTAMP EXCHANGE

PRIORITY

This non-provisional application is a U.S. National Stage Filing under 35 U.S.C. § 371 of International Patent Application Ser. No. PCT/CN2013/079197, filed Jul. 11, 2013, and entitled "APPARATUS AND METHOD FOR TWO-WAY TIMESTAMP EXCHANGE".

TECHNICAL FIELD

The present invention relates to an apparatus and method for two-way timestamp exchange, for example a two-way timestamp exchange relating to a precision time protocol, PTP.

BACKGROUND

Mobile backhaul (MBH) is a transport network that provides connectivity from radio access base stations (or cell sites) to their corresponding control and switching elements located deeper in the core of a telecommunications network, i.e. the network that connects to the backbone of the telecommunications network. Mobile backhaul is currently an important area of technological advance, since the mobile backhaul will play an important part in ensuring that future networks are able to cope with the demands being imposed by applications such as wireless broadband, and the ever increasing traffic requirements being placed on telecommunication networks.

In mobile backhaul, distribution of synchronization information is a vital feature. Without proper synchronization information mobile networks are unable to function correctly. For example, in terms of Wideband Code Division Multiple Access (WCDMA), or Long Term Evolution Frequency Division Duplexing (LTE FDD), frequency synchronization is very important. The general requirement on an air interface is a frequency accuracy of 50 ppb between two base stations, as specified by the Third Generation Partnership Project (3GPP) specifications. One of the purposes is to minimize disturbance on the air interface to secure handover between radio base stations.

Newer mobile communication technologies require synchronized phase and precise Time of Day (ToD) in addition to synchronized frequency. Among these technologies are LTE Time Division Duplexing (LTE-TDD), Mobile WiMAX/TDD, Time Division Synchronous Code Division Multiple Access (TD-SCDMA), and Femtocell technology. The general requirement on the air interface is a frequency accuracy of 50 ppb and a phase/time accuracy of the order of 1 μsec (e.g. CDMA200≥±3 μsec, LTE-TDD large cell≥±5 μsec, LTE-TDD small cell≥±1.5 μsec).

As mentioned above, accompanying the development of mobile backhaul is the dramatic increase in data traffic and transmission. Mobile backhaul over Ethernet is becoming a more popular technology. Introducing time and frequency synchronization for Ethernet is therefore becoming more critical.

Distributing phase and time information using a Precision Time Protocol (PTP), as defined in IEEE technical specification 1588-2008, is an emerging packet based technology that is popular with telecommunication service providers, accompanying the boom in PTP telecommunication profiles. PTP is a protocol used to synchronize clocks throughout a network.

However, even though PTP is currently one of the areas of significant interest in the telecommunications industry, it is comparatively new, since the usable standard was only finalized in 2008. As a result, many mechanisms which are applied in a traffic network, to make the traffic network more efficient, do not consider this specific packet based time distribution technology and its special requirements (which tend to be very hardware dependent). In addition, some popular mechanisms being used in traffic networks may even affect the PTP function.

One such mechanism that can affect the functionality of a PTP function is a path diversity resiliency mechanism, which can cause path consistency issues in a PTP function, as explained below.

Typical traffic network resiliency mechanisms, for example Link Aggregation Group (LAG), Multi-Chassis Link Aggregation Group (MC-LAG) or Distributed Resilient Network Interconnect (DRNI), can cause PTP path inconsistency issues and problems. Further details of DRNI can be found in the technical specifications relating to IEEE 802.1AXbq, DRNI task group.

Link aggregation has been introduced because of the need to provide resiliency in an Ethernet network. Link aggregation involves combining (aggregating) multiple network links (or paths) in parallel to increase throughput beyond what a single link could sustain, and to also provide redundancy in case one of the links fails. The combined links form a link aggregation group (LAG). Combined link interfaces share one physical address (i.e. one Media Access Control, MAC, address). Further details of link aggregation can be found in the technical specification relating to IEEE 802.3ad, Aggregation of Multiple Link Segments.

In terms of the traffic over LAG, load balance is used to balance the traffic load among the combined links. Each packet/stream is mapped to a specific link, for example, by applying a hash algorithm based on the destination MAC address. The LAG entity on each end of the LAG carries the hash algorithm separately, and as a result for the two-way protocol, the forward direction stream and the reverse direction stream generally traverse different paths or links, i.e. due to the fact that they are directed to a particular link by a hash algorithm.

Therefore, since PTP is a two-way protocol, this will induce PTP messages that traverse different paths or links in the two directions. A consequence of this is that the timestamps of two event messages (for example synchronization and delay-request messages) are generated at different physical layer timestamp generators (such as different timestamp counters). In some cases, the links of the LAG may be physically different from each other.

FIG. 1 shows a typical example of how time messages are sent over a network that employs LAG and a precision time protocol. FIG. 1 shows a first network node $101_1$ (for example acting as a slave node) and a second network node $101_2$ (for example acting as a master node). Each network node 101 comprises a processing unit 103 (i.e. $103_1$, $103_2$). The processing units 103 comprise a PTP functional unit 105 (i.e. $105_1$, $105_2$) and a LAG functional unit 107 (i.e. $107_1$, $107_2$). The first and second network nodes $101_1$, $101_2$ communicate over multiple paths or links. For ease of reference FIG. 1 shows three such paths or links $106_1$, $106_2$ and $106_3$. Each network node 101 comprises a plurality of interfaces or ports 104 (i.e. $104_{12}$, $104_{13}$, $104_{15}$, $104_{21}$, $104_{24}$, $104_{26}$) for interfacing with the plurality of paths or links 106.

The basic principle of PTP involves a two-way timestamp exchange. During PTP synchronization a master node $101_2$ sends out regular Sync Messages to a slave node $101_1$ via a link, for example link $106_1$. A first timestamp t1 is generated by a physical layer (PHY) timestamp generator located at the master node $101_2$, for example a master PHY counter. The first timestamp t1 corresponds to the time that the Sync Message is sent from the master node $101_2$ over the path $106_1$. A second timestamp t2 is generated by a physical layer timestamp generator located at the slave node $101_1$, for example a slave PHY counter. The second timestamp t2 corresponds to the time that the Sync Message is received at the slave node $101_1$ from the path $106_1$.

The slave node $101_1$ then sends a Delay Request message (Delay-req) to the master node $101_2$, shown in the example of FIG. 1 over path $106_2$. A third timestamp t3 is generated by a physical layer timestamp generator located at the slave node $101_1$, by the slave PHY counter. The third timestamp t3 corresponds to the time that the Delay Request message (Delay-req) is sent from the slave node $101_1$ over the path $106_2$. A fourth timestamp t4 is generated by a physical layer timestamp generator located at the master node $101_2$, by the master PHY counter. The fourth timestamp t4 corresponds to the time that the Delay-req Message is received at the master node $101_2$ from the path $106_2$.

The master node $101_2$ then sends a Delay Response message (Delay-resp) to the slave node $101_1$, over the path $106_1$, for enabling the slave node $101_1$ to collect the fourth timestamp t4.

PTP time and phase performance has two important factors that affect it, one being the accuracy of event message timestamps, and the other being symmetry on the transporting paths of event messages.

With regard to the former, i.e. event message timestamp accuracy, it can be seen from FIG. 1 that timestamps t1 and t4 are generated at a master PHY counter located at a master node $101_2$, while timestamps t2 and t3 are generated at a slave PHY counter located at a slave node $101_1$.

A PHY timestamp counter is driven by what is known as a "1588 clock" and a Pulse Per Second (PPS) signal from a 1588 local clock. Normally the 1588 local clock is implemented by a digitally controlled oscillator (DCO) and resides in a central card (control card), so the 1588 clock and PPS are distributed to PHY timestamp counters which are residing on line cards. For different cards and different PHY timestamp counters, the clock and PPS will travel along different paths, which contributes to inaccuracy problems. Furthermore, PHY timestamp counters from different vendors also have accuracy differences, which cause inaccuracy problems.

The assumption currently made on the accuracy contribution from a 2×PHY is in the order of 15 ns.

With regard to a symmetric event message transporting path, the basic assumption is that:

$$t2-t1=t4-t3$$

However, any asymmetry of message paths will contribute with half of that to the error in the time offset calculation (for example, a 3 µs asymmetry would exceed the target requirement of 1.5 µs).

From the above it can be seen that this type of resiliency mechanism used in a typical Ethernet network can affect PTP path consistency, and eventually affect the PTP performance due to inaccuracies introduced by timestamp generators.

FIG. 2 shows an example of another type of network where similar problems can occur. FIG. 2 shows a Multi-Chassis Link Aggregation Group (MC-LAG), Distributed Resilient Network Interconnect (DRNI) type system, known as MC-LAG (DRNI).

This mechanism has been introduced to expand resiliency from the node to the network, addressing a key resiliency challenge that service providers have identified.

It is an enhanced form of link aggregation, providing a resilient interconnect using multiple links among one or more nodes, for example between nodes $201_1$ and $201_2$ of FIG. 2, via MC-LAG peer nodes $211_1$ and $211_2$. The MC-LAG peer nodes $211_1$ and $211_2$ share information over communication link $206_5$, such that failure of a particular node can result in a standby LAG being used in place of a failed LAG. As described for FIG. 1, the slave node $201_1$ and master node $201_2$ comprise a processing unit $203_1, 203_2$ and a PTP functional unit $205_1, 205_2$ and a corresponding LAG functional unit $207_1, 207_2$. Links $206_1, 206_2, 206_3, 206_4$ are connected to the master or slave nodes $201_1, 201_2$ by interfaces or ports 204 (i.e. $204_{12}, 204_{13}, 204_{21}, 204_{24}$).

The MC-LAG (DRNI) system of FIG. 2 is intended to provide both node and link level redundancy into a carrier network, and also enables the load balancing of services.

Such a network can induce the same issues and problems for two-way protocols over LAG, as described above with reference to FIG. 1. Therefore, as above, this type of Ethernet resiliency method will also affect PTP path consistency issues, which will eventually affect the PTP performance.

Thus, the widely-deployed packet network resiliency mechanisms, such as LAG and MC-LAG will induce PTP path inconsistency in the two message sending directions, which introduces timestamp error and asymmetry error to the PTP offset calculation.

This problem is applied to all PTP implementations, especially in modular systems. Furthermore, in modular systems this problem can also result in the PTP function becoming unavailable.

SUMMARY

According to a first aspect of the present invention, there is provided a method in a first network entity which is capable of communicating over a plurality of communication links with a second network entity using a two-way timestamp exchange. The method comprises the steps of receiving at the first network entity a first timestamp message of the two-way timestamp exchange protocol from the second network entity, and determining on which link the first timestamp message was received. Based on the determination of the link, transmitting from the first network entity a second timestamp message to the second network entity on the same link.

Thus, in the event of a change in status of a communications link, the first and/or second network entity reliably determine the same link on which to exchange timestamp messages.

According to another aspect of the present invention there is provided, a method in a second network entity which is configured to communicate over a plurality of communication links with a first network entity using a two-way timestamp exchange. The method comprising the steps of detecting a change in the status of at least one of the plurality of communication links between the second network entity and the first network entity. In response thereto, the method determines whether a notification signal is received from the first network entity within a predefined period. The notification signal is informing the second network entity that the first network entity will be receiving and transmitting timestamp messages via the same link. In the event that the notification signal is not received within the predetermined period, receiving at the second network entity a first timestamp message from the first network entity; and determining on which link the first timestamp message was received. Based on the determination of the link, transmitting from the second network entity a second timestamp message to the first network entity on the same link.

According to another aspect of the present invention there is provided a network entity which is capable of communicating over a plurality of communication links with a second network entity using a two-way timestamp exchange. The network entity comprises a receiving unit, a transmitting unit and a processing unit. The processing unit is configured to determine on which link a first timestamp message is received, and, based on the determination of the link, transmit from the first network entity a second timestamp message to the second network entity on the same link.

According to another aspect of the present invention, there is provided a network entity which is capable of communicating over a plurality of communication links with another network entity using a two-way timestamp exchange. The network entity comprises a receiving unit, a transmitting unit and a processing unit. The processing unit is configured to detect a change in the status of at least one of the plurality of communication links. In response to detecting a change, the processing unit is further configured to determine whether a notification signal is received from the other network entity within a predefined period, the notification signal informing the network entity that the other network entity will be receiving and transmitting timestamp messages via the same port. In the event that the notification signal is not received within the predetermined period the processing unit is further configured to determine on which link a first timestamp message is received, and based on the determination of the link, transmit from the network entity a second timestamp message to the other network entity on the same link.

According to another aspect of the present invention, a method in a system comprises a first network entity and a second network entity which are capable of communicating over a plurality of communication links using a two-way timestamp exchange. At any time only one of the first and second network entity receive a first timestamp message of the two-way timestamp exchange protocol from the other of the first and second network entity, and determine on which link the first timestamp message was received. Based on the determination of the link, the method comprises transmitting a second timestamp message to the other of the first and second network entity on the same link.

According to another aspect of the present invention, a system comprises a first network entity and a second network entity capable of communicating over a plurality of communication links using a two-way timestamp exchange. The first network entity comprises a first processing unit configured to detect a change in the status of at least one of the plurality of communication links, and, in response thereto transmit a notification signal to the second network entity configured to inform the second network entity that the first network entity is configured to specify receiving and transmitting timestamp messages via the same link. The second network entity comprises a second processing unit configured to detect a change in the status of at least one of the plurality of communication links, and, in response thereto: determine whether a notification signal is received from the first network entity within a predefined period, the notification signal informing the second network entity that the first network entity is configured to specify receiving and transmitting timestamp messages via the same link. In the event that the notification signal is received by the second network entity within the predetermined period, the second processing unit being further configured to determine on which link the notification signal was received; and use this link for subsequent communication of timestamp messages with the slave network entity.

According to another aspect of the present invention, there is provided a computer program product, configured when run on a computer to conduct a method according to any one of methods defined in the appended claims.

BRIEF DESCRIPTION OF THE DRAWINGS

For a better understanding of examples the present invention, and to show more clearly how the examples may be carried into effect, reference will now be made, by way of example only, to the following drawings in which.

DETAILED DESCRIPTION

The embodiments of the invention will be described below with reference to a two-way exchange of timestamp messages, for example, in a precision time protocol (PTP) application. It is noted, however, that the embodiments of the invention can be used with any form of two-way timestamp exchange protocol, as defined in the appended claims.

Figure 1:
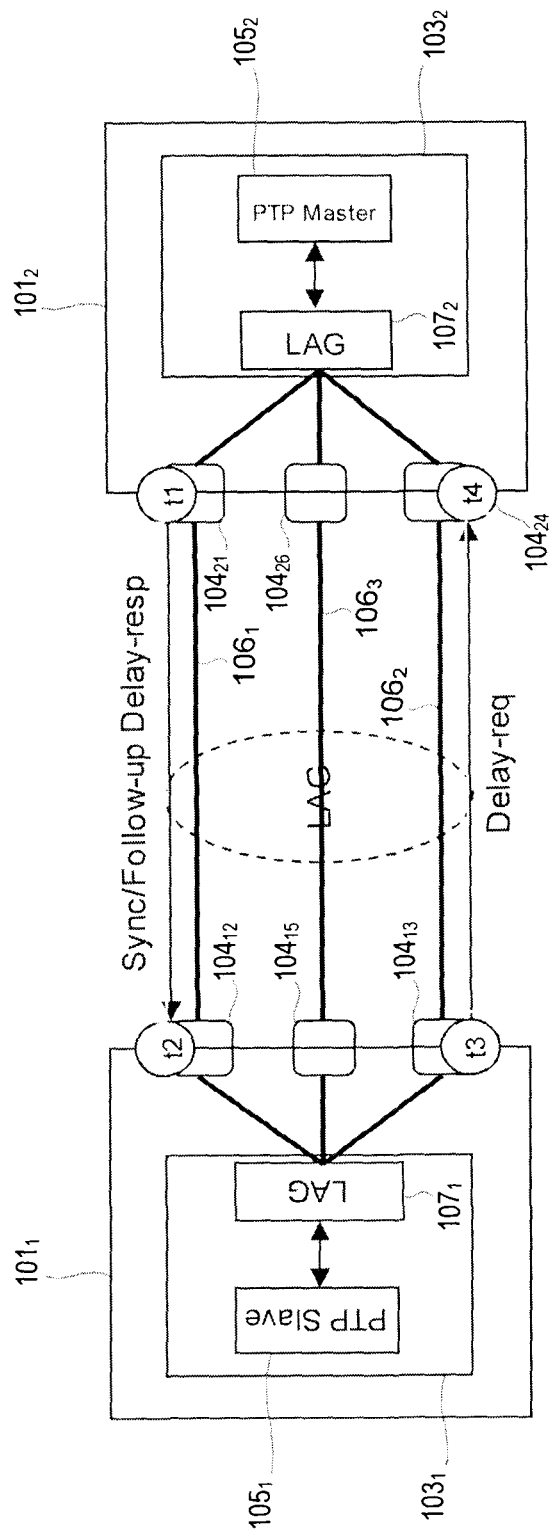
FIG. 1 shows an example of a communication network employing a link aggregation group, LAG, between a first network entity and a second network entity.
Figure 2:
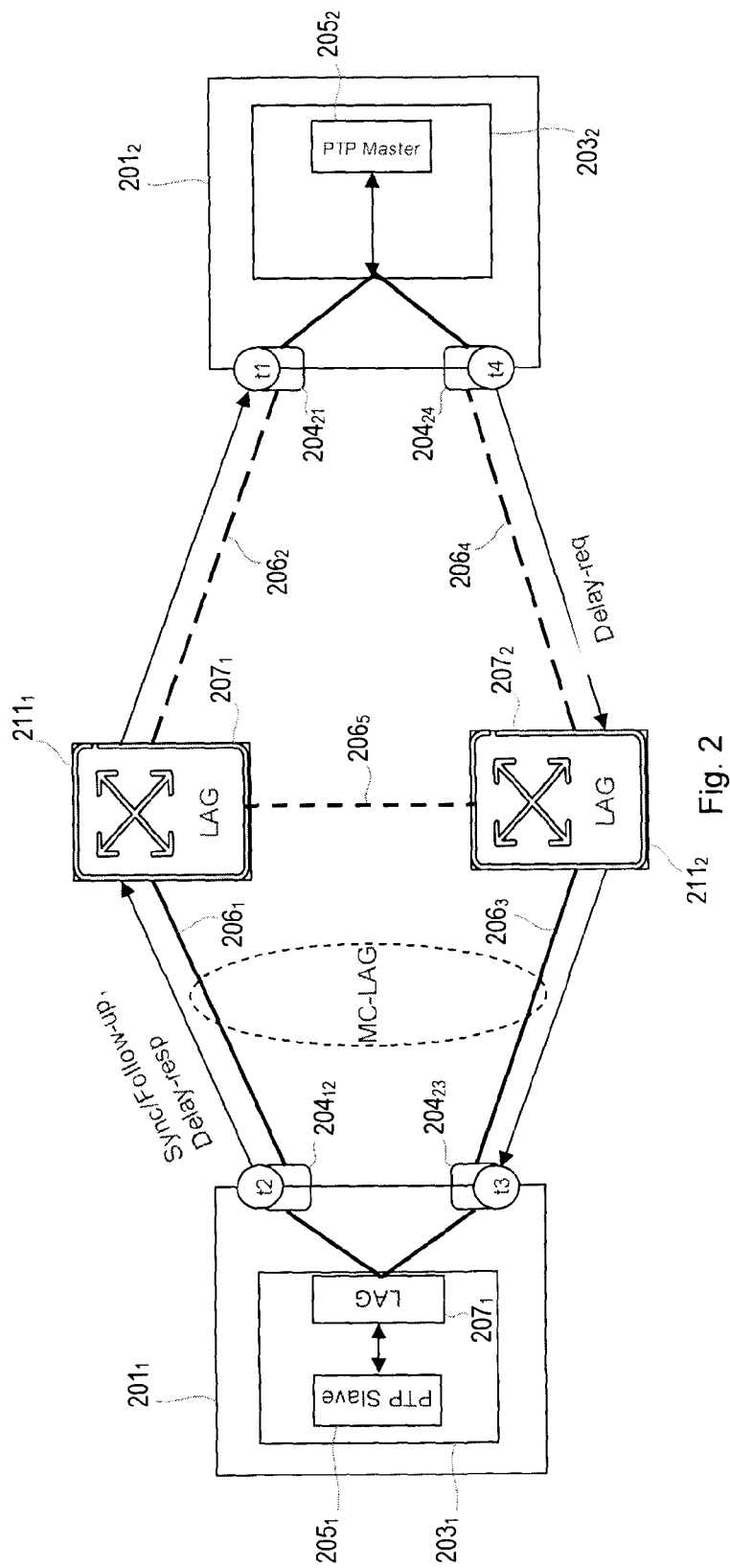
FIG. 2 shows an example of a communication network employing a multi-chassis link aggregation group, MC-LAG, between a first network entity and a second network entity.
Figure 3:
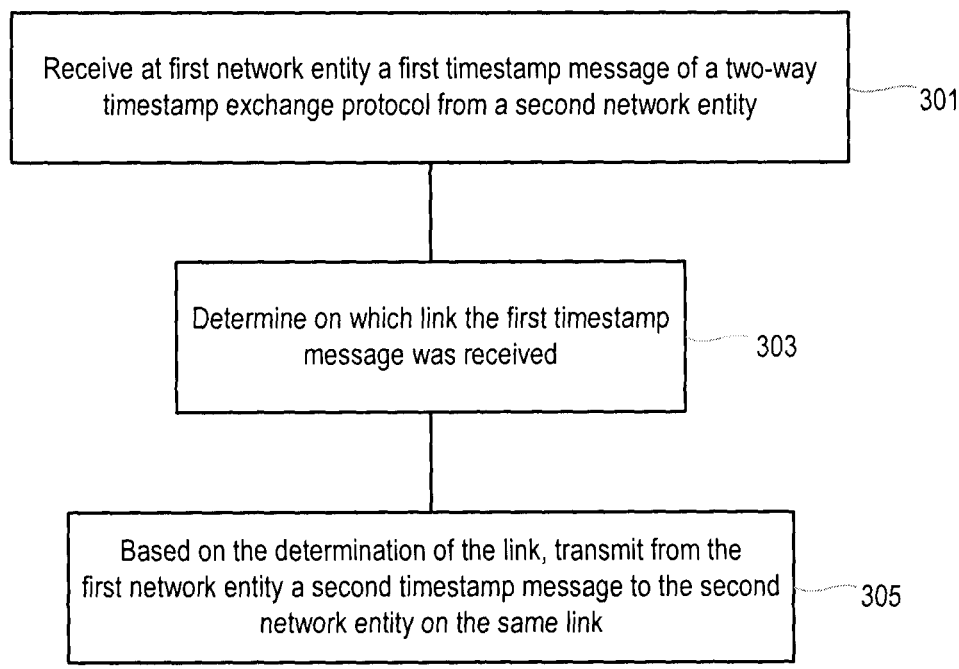
FIG. 3 shows a method according to a first embodiment of the present invention.

FIG. 3 shows a method in a first network entity according to an embodiment of the present invention, whereby the network entity is capable of communicating over a plurality of communication links with a second network entity using a two-way timestamp exchange. The two-way timestamp exchange may constitute part of a precision time protocol, PTP, although as mentioned above other forms of two-way timestamp exchange are also intended to be covered by embodiments of the invention. The method comprises the step of receiving at the first network entity a first timestamp message of the two-way timestamp exchange protocol from the second network entity, step 301. In step 303 the method comprises the step of determining on which link the first timestamp message was received. Based on the determination of the link, the method comprises the step of transmitting from the first network entity a second timestamp message to the second network entity on the same link as the first timestamp message, step 305.

This has the benefit of ensuring that an outgoing timestamp message is sent on the same link over which the incoming timestamp message was received, thereby avoiding any path inconsistency issues when exchanging two-way timestamp messages, such as PTP timestamps. This embodiment therefore acts against the normal practice of exchanging timestamp massages over different links when operating in an environment where multiple links exist between a first network entity and a second network entity, for example in a link aggregation system, and/or when a link resiliency mechanism is used. In particular, an embodiment of the invention determines a link for communicating timestamp messages independently of the determination by the link resiliency mechanism of which link to use in a link aggregation group. The timestamp messages are transmitted on a link selected by an aspect of the invention, and not a link determined by the link resiliency mechanism.

In some aspects, only one of the master and slave network entities always function to transmit back a second timestamp message on the same link as the first timestamp message was received. In the examples described, the slave network entity (node) is described as always transmitting a timestamp message on the same link/port as a previous timestamp message was received. The master network entity (node) will also function in this same way, but only if the slave node is not configured to specify receiving and transmitting timestamp messages via the same link, i.e. the consistency function according to examples of the invention. Therefore, in any master-slave system, only one of the master and slave nodes function to transmit back a second timestamp message on a link selected only as the same link as the first timestamp message was received.

The functions described for the master and slave are exemplary, and in a further embodiment, the master and slave functions are reversed.

Other messages may also be communicated over the same link, for example other messages that are communicated as part of a two-way timestamp exchange, or other messages in a PTP application.

The embodiments can handle only one side of the Master/Slave deploying this function, for ensuring that timestamp messages traverse the same path/link. As such, embodiments of the invention can easily inter-operate with conventional network entities which do not implement this function. In particular, when only one of the master or slave port comprise the consistency function, then identifying the ingress interface information of the timestamp message and transmitting a timestamp message on the same link provides for a consistent link.

In some examples, if both sides of the master/slave network entity are enabled with a consistency function according to an aspect of the invention, a signaling mechanism is configured to prevent the designated port from swinging between Master and Slave control.

The method may further comprise the step of transmitting a notification signal to the second network entity, prior to the step of receiving the first timestamp message and/or transmitting the second timestamp message, for informing the second network entity that the first network entity will be receiving and transmitting timestamp messages via the same link. In this way a second network entity is able to determine that the first network entity has been configured to send and receive timestamp messages via the same link, such that the second network entity can be configured accordingly. The notification signal provides the second network entity with the information on which link to use for the timestamp messages, without requiring the second network entity to determine this information separately. In particular, the second network entity (master) uses the link on which the notification message was received. If more than one notification message is received, the link/port on which the first notification message was received is used for subsequent timestamp messages. In some aspects, the notification signal ensures that a common link is selected for each direction, for example, without both first and second entities chasing each other.

The receipt of the notification signal informs the master network entity that the slave network entity is also configured with the consistency function according to an aspect of the invention. If the master network entity does not receive the notification message within a pre-determined period of time following a link change, the master network entity assumes that the network entity is not configured with the consistency function according to an aspect of the invention. The master network entity functions differently according to whether or not the slave network entity is configured with the consistency function according to an aspect of the invention. When the slave network entity is so configured, the master network entity uses the link/port determined by the notification message, as described. When the slave network entity is not so configured, the master network entity functions in the same manner as the slave network entity according to an aspect of the invention. In particular, the master network entity transmits timestamp messages on the same link as they were received.

The notification signal may be transmitted via the same link, that is the same link as used to receive and transmit the first and second messages. The sending of a notification signal has the advantage of allowing a second network entity, for example a network entity acting as a master node, to determine which link the notification signal was received on, such that the second network entity can also be configured to send and receive messages over the same link, as described later in the application. According to one embodiment the notification signal comprises a type-length-value (TLV) signal of a precision time protocol, for example a Time Message path Consistency Notification message.

According to one embodiment the step of determining on which link the first message was received comprises the step of determining which port the first message was received via, the port being one of a plurality of ports of the first network entity.

In an embodiment where the first network entity comprises a plurality of ports provided on a single line card of the first network entity, the method may comprise the step of storing port interface information in a mapping table of the single line card. The port interface information enables the first network entity to determine which port the first timestamp message was received via, and transmit the second timestamp message via the same port. The determined port is therefore used as both an ingress and egress port for communicating over the same communication link.

In an embodiment where the first network entity comprises a plurality of ports that are distributed over two or more line cards of the first network entity, the method may comprise the step of storing the port interface information in a respective mapping table of each of the two or more line cards. The port interface information stored on the two or more line cards enables the first network entity to determine which port the first timestamp message was received via, and transmit the second timestamp message via the same port. The determined port is therefore used as both an ingress and egress port for communicating over the same communication link.

In the embodiments described above the method may comprise the step of determining the relevant link or port in response to detecting a change in the status of at least one of the plurality of communication links between the first network entity and the second network entity.

For example, in one embodiment a change in status such as a failure of one or more links of the plurality of communication links that constitute a link aggregation group, LAG, or a multi-chassis link aggregation group, MC-LAG, between the first network entity and the second network entity is used as a trigger for determining which link a first message is received over, and then transmitting a second message over the same link.

According to another example, a change in status may comprise a change to the communication links that constitute a link aggregation group, LAG, or a multi-chassis link aggregation group, MC-LAG, between the first network entity and second network entity. The change in communication links can take part when an LAG or MC-LAG is being initialised or set-up, or during operation of a LAG or MC-LAG application, whereby member links forming a LAG or MC-LAG may change.

According to another example, a change in status may comprise a change of communication link resulting from a resiliency diversity mechanism that is configured to control the plurality of communication links.

In the embodiments described above the first network entity may comprise a slave node and the second network entity a master node.

Figure 4:
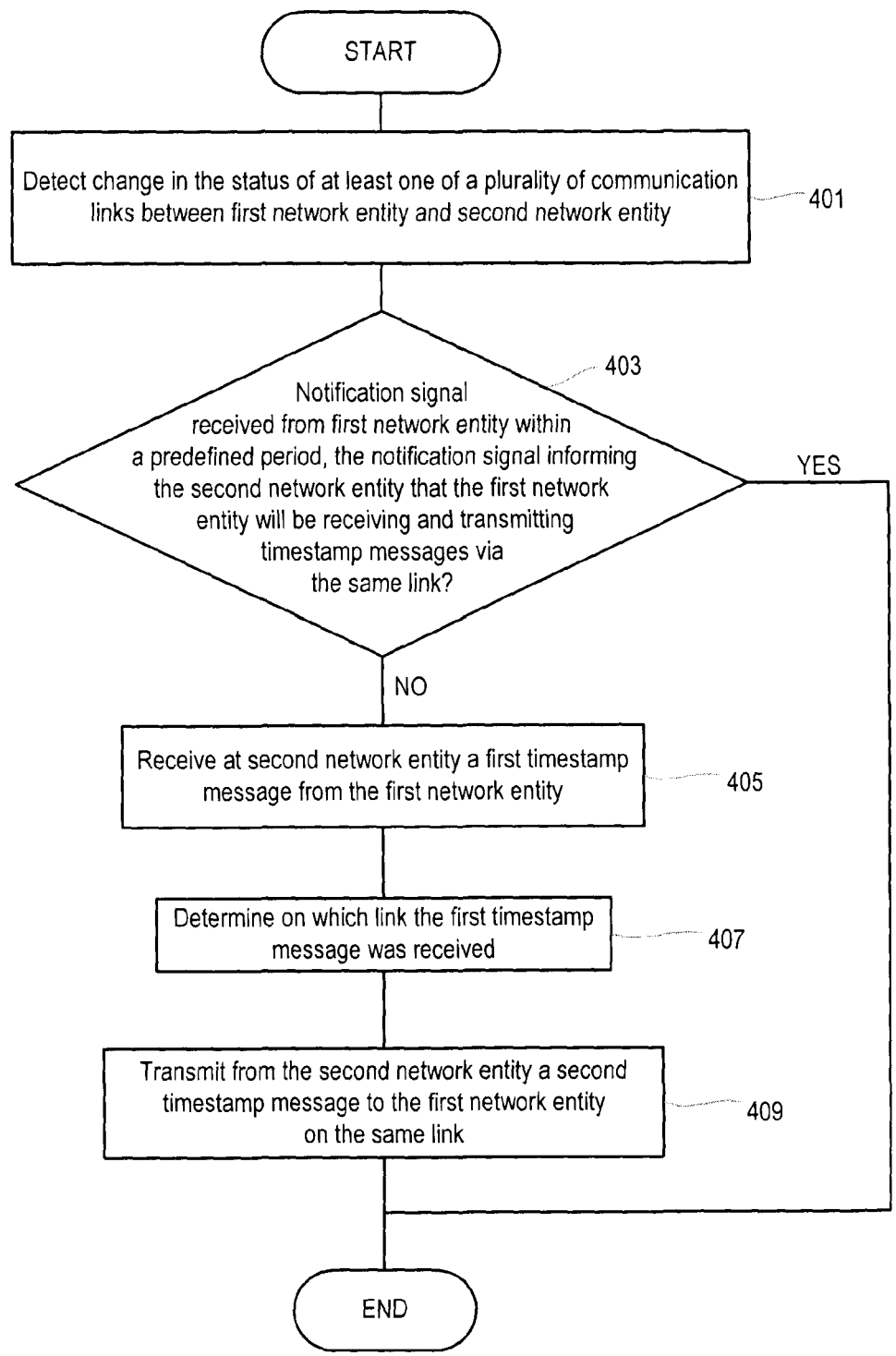
FIG. 4 shows a method according to another embodiment of the present invention.

FIG. 4 shows the steps performed in a second network entity, for example a network entity operating as a master node, according to another embodiment of the present invention, whereby the second network entity is configured to communicate over a plurality of communication links with a first network entity using a two-way timestamp exchange.

The method comprises the step of detecting a change in the status of at least one of the plurality of communication links between the second network entity and the first network entity, step 401. As mentioned above, a change in status of at least one of the plurality of communication links may comprise, for example, a failure of one or more links of the plurality of communication links that constitute a link aggregation group, LAG, or a multi-chassis link aggregation group, MC-LAG, between the first network entity and the second network entity. According to another example, a change in status may comprise a change to the communication links that constitute a link aggregation group, LAG, or a multi-chassis link aggregation group, MC-LAG, between the first network entity and second network entity, for example when the member links of a LAG or MC-LAG are initially set-up during an initialisation procedure, or when the member links of a LAG or MC-LAG are changed for some reason during operation. According to another example, a change in status may comprise a change of communication link resulting from a resiliency diversity mechanism that is configured to control the plurality of communication links.

In response to detecting a change in status in step 401, the method comprises the step of determining whether a notification signal is received from the first network entity within a predefined period, step 403. The notification signal informs the second network entity that the first network entity will be receiving and transmitting timestamp messages via the same link. In this way the second network entity is able to rely on the first network entity taking steps to ensure that timestamp messages are communicated over the same link between the first network entity and the second network entity, such that no action is required in this respect from the second network entity. The receipt of the notification signal confirms that a slave node will be performing a path consistency function, such that the master node does not have to perform the path consistency function itself.

Therefore, in the event that it is determined in step 403 that a notification signal is received within the predefined period, then no further action is required by the second network entity with regard to setting up path consistency, and the processing ends. One advantage of this is that a slave node, which is generally less busy than a master node, will initially try to perform a path consistency function. Another advantage is that, if a slave node does not have the path consistency functionality configured thereon, then the master node is still able to perform this functionality itself to ensure that path consistency is maintained, as explained below.

In the event that it is determined in step 403 that the notification signal is not received within the predefined period, the method comprises the steps of receiving at the second network entity a first timestamp message from the first network entity, step 405, determining on which link the first timestamp message was received, step 407 and, based on the determination of the link, transmitting from the second network entity a second timestamp message to the first network entity on the same link, step 409. The first timestamp message received in step 405 may comprise a next PTP message, for example, from a first network entity (slave node).

It is noted that, in the event that it is determined in step 403 that a notification signal is received within the predefined period, the method may proceed to perform the steps (not shown in FIG. 4) of determining on which link the notification signal was received, and use this link for subsequent communication of timestamp messages with the first network entity. As such the second network entity moves communication of subsequent messages, such as timestamp messages, to the link upon which the notification signal was received. In some aspects, this allows the timestamp messages to use the same link when only the second network entity (i.e. not the first network entity) is configured according to an example of the present invention.

The notification signal may comprise an implicit indication of the link which is being used to convey the notification signal, thereby enabling the second network entity to determine on which link the notification was received using this information alone, without having to determine over which port the notification was received. Alternatively, the second network entity may be configured to determine over which port the notification signal was received, thereby enabling the link over which the notification signal was received to be determined in this way.

It is noted that the methods performed in the embodiments of FIGS. 3 and 4 may be performed on a single network entity, such that a single network entity is able to perform the functions of a master node, a slave node, or both.

Figure 5:
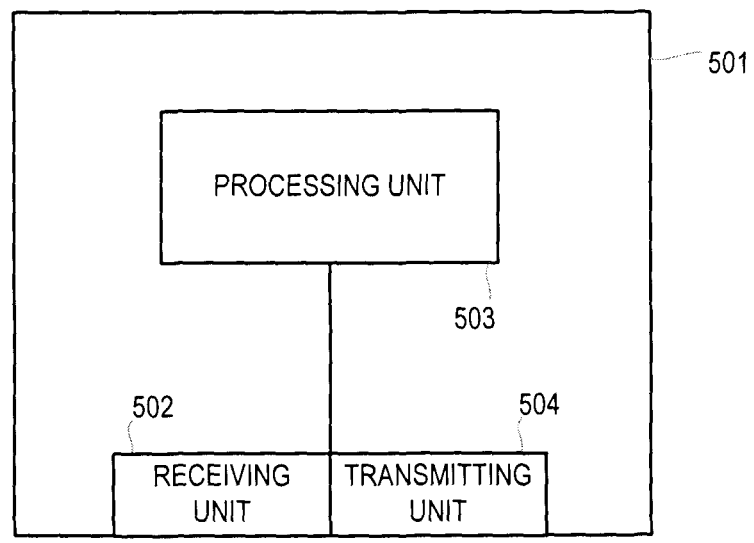
FIG. 5 shows a network entity according to an embodiment of the present invention.

FIG. 5 shows a network entity 501 according to an embodiment of the present invention, for example a slave node, which is capable of communicating over a plurality of communication links with a second network entity using a two-way timestamp exchange. The network entity 501 comprises a receiving unit 502 for receiving a first timestamp message from a second network entity, and a transmitting unit 504 for transmitting a second timestamp message to the second network entity. The first network entity 501 also comprises a processing unit 503 that is configured to determine on which link the first timestamp message is received. Based on the determination of the link, the processing unit 503 is configured to cause the second timestamp message to be transmitted to the second network entity on the same link. This has the benefit of ensuring that timestamp messages, such as timestamp messages in a PTP application, are transmitted over a consistent path or link.

The receiving unit 502 and the transmitting unit 504 may comprise one or more ports, as described later in the application.

The processing unit 503 may be further configured to cause a notification signal to be transmitted to the second network entity, prior to the first timestamp message being received and/or the second timestamp message being transmitted, for informing the second network entity that the network entity will be receiving and transmitting timestamp messages via the same link.

In one embodiment the network entity 501 may comprise a plurality of ports for communicating with the second network entity via the plurality of communication links, and wherein the processing unit 503 is configured to determine on which link a first timestamp message is received by determining on which port the first message was received.

The processing unit 503 may be configured to determine the link in response to detecting a change in the status of at least one of the plurality of communication links between the network entity and the second network entity. For example, in one embodiment a change in status such as a failure of one or more links of the plurality of communication links that constitute a link aggregation group, LAG, or a multi-chassis link aggregation group, MC-LAG, between the first network entity and the second network entity is used as a trigger for determining which link a first message is received over, and then transmitting a second message over the same link. According to another example, a change in status may comprise a change to the communication links that constitute a link aggregation group, LAG, or a multi-chassis link aggregation group, MC-LAG, between the first network entity and second network entity, for example when the member links of a LAG or MC-LAG are initially set-up during an initialisation procedure, or when the member links of a LAG or MC-LAG are changed for some reason during operation. According to another example, a change in status may comprise a change of communication link resulting from a resiliency diversity mechanism that is configured to control the plurality of communication links.

Figure 6:
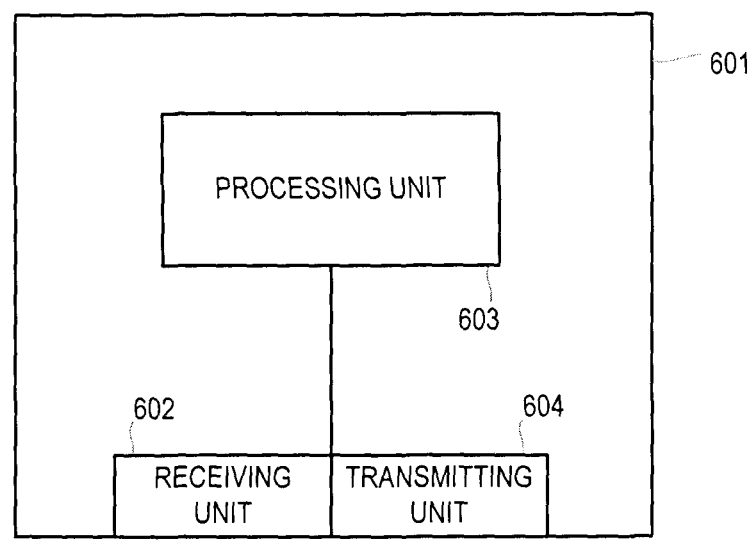
FIG. 6 shows a network entity according to another embodiment of the present invention.

FIG. 6 shows a network entity 601 according to another embodiment of the present invention, for example a master node, which is capable of communicating over a plurality of communication links with another network entity using a two-way timestamp exchange. The network entity 601 comprises a receiving unit 602 and a transmitting unit 604. The network entity 601 also comprises a processing unit 603 that is configured to detect a change in the status of at least one of the plurality of communication links. In response to detecting such a change, the processing unit 603 is configured to determine whether a notification signal is received from the other network entity within a predefined period. The notification signal informs the network entity that the other network entity will be receiving and transmitting timestamp messages via the same port.

In the event that the notification signal is not received within the predetermined period the processing unit 603 is further configured to determine on which link a first timestamp message is received and, based on the determination of the link, transmit from the network entity a second timestamp message to the other network entity on the same link.

In response to a notification signal being received within the predefined period, the processing unit 603 may be further configured to determine on which link the notification signal was received, and, use this link for subsequent communication of timestamp messages with the first network entity.

The plurality of communication links may constitute a link aggregation group, LAG, or a multi-chassis link aggregation group, MC-LAG. The two-way timestamp exchange may constitute part of a precision time protocol, PTP.

It is noted that the network entities described in the embodiments of FIGS. 5 and 6 may be combined into a single network entity, such that a single network entity is able to perform the functions of a master node, a slave node, or both.

The embodiments of the present invention provide the function of ensuring a consistent path for the communication of timestamp messages between a first network entity and a second network entity that are capable of communicating over a plurality of communication links using a two-way timestamp exchange.

Figure 7:
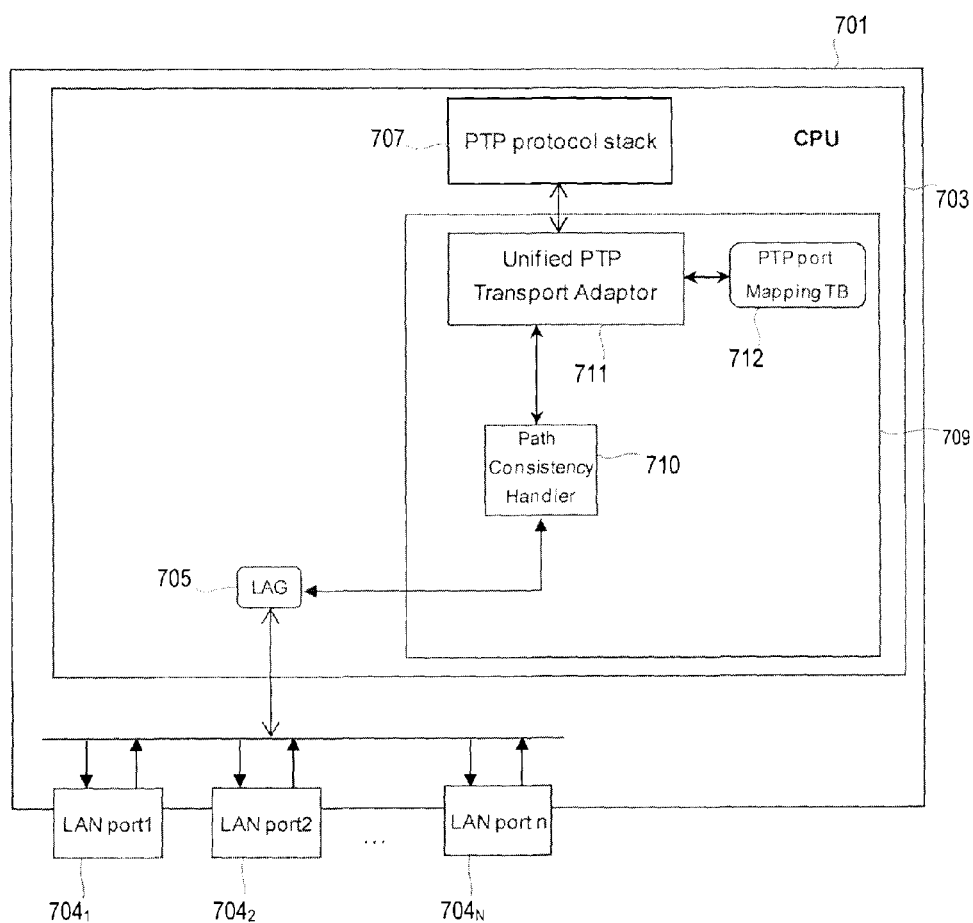
FIG. 7 shows further details of another example of a network entity according to an embodiment of the present invention.

FIG. 7 provides further details of a network entity 701 according to another embodiment of the present invention. The network entity comprises a processing unit 703 that is configured to determine on which link a first timestamp message is received, and based on the determination of the link, the processing unit 703 is configured to cause a second timestamp message to be transmitted to a second network entity on the same link.

The network entity is shown as comprising a plurality of ports $704_1$ to $704_N$ for communicating over the plurality of links with the second network entity (not shown), the plurality of ports forming a receiving unit and/or a transmitting unit as described above. The plurality of links are combined in a resiliency mechanism.

In an application where the plurality of communication links constitute a link aggregation group, LAG (including a MC-LAG), the processing unit 703 comprises a LAG functional unit 705 that is configured for handling how messages are received over the plurality of communication links. For example, the LAG functional unit 705 can control how messages to be transmitted between one network node and another are distributed among the member links that constitute a LAG. Often a hash function, for example, is used to evenly distribute messages to different member links of the LAG. The LAG functional unit 705 may also comprise a resiliency function for handling changes to the plurality of member links that constitute the LAG, for example in response to a link failure. Aspects of the invention may provide a modified resiliency mechanism which does not carry out the hash function for identified messages, i.e. timestamp messages. For example, a bit enhance may signal to a resiliency module configuring the resiliency mechanism that the timestamp message is transmitted on the identified (i.e. ingress) port, instead of determining the port with the resiliency mechanism.

In an application that provides a two-way timestamp exchange using a precision time protocol, PTP, the processing unit 703 comprises a PTP protocol stack 707 for administering PTP functions. The functions of the PTP protocol stack 707 will be familiar to a person skilled in the art, as defined in IEEE 1588-2008, and include the functions of sending/receiving PTP packets, and the processing of timestamps relating to PTP packets.

The processing unit 703 comprises a functional module 709 providing the functions particular to an example of the present invention. The module 709 schematically illustrates the functions to be carried out by the processing unit 703, and is not generally a physically separate module. The module 709 can be termed a consistency module, configured to ensure a consistent link for two-way exchange of timestamp messages. The functions of the module 709 are functionally between the LAG functional unit 705 and timestamp protocol stack 707.

The processing unit 703 comprises a first functional unit referred to hereinafter as a "Path Consistency Handler" 710. The Path Consistency Handler 710 is the functional unit of the processing unit 703 that is configured to flexibly or dynamically adapt a LAG function in response to a change in status of one or more of the plurality of communication links that constitute a LAG, for example whereby the change in status is triggered by a resiliency function, to ensure that messages, including timestamp messages, traverse the same link or path.

The Path Consistency Handler 710 is configured to monitor the status information of the LAG unit 705. Any status change, for example a LAG member update (for example in response to a new set-up, or in response to a link failure) will become known to the Path Consistency Handler 710 by monitoring the status information of the LAG unit 705.

The Path Consistency Handler 710 is also configured to capture the link (or ingress interface information) that a first timestamp message (such as a PTP timestamp message) is received on, to dynamically reflect the up-to-date interface that a PTP timestamp message traverses.

Upon detecting a change to the status of at least one of the plurality of communication links connecting this network entity with a second network entity (captured as a LAG status change), the Path Consistency handler 710 is configured to determine the link over which a first message is received. The link can be determined by capturing the ingress interface of a next PTP message, and assigning this ingress interface as the egress interface for transmitting a PTP message. Capturing the ingress interface may involve determining a PTP port over which the first message (for example a next PTP timestamp message) is received over, and designating that PTP port as the egress port for sending PTP messages. In some examples, the PTP port is in the line card module. Alternatively, the PTP port is in the controller card.

The processing unit 703 also comprises a functional unit referred to hereinafter as a "Unified PTP Transport Adaptor" 711. The Unified PTP Transport Adaptor 711 interfaces with the PTP protocol stack 707, a PTP port mapping table 712 and the Path Consistency Handler 710.

The Unified PTP Transport Adaptor 711 is configured to obtain each user configured PTP port and to provide port mapping information, the PTP port mapping information being stored in the PTP port mapping table 712. The information obtained by the Unified PTP Transport Adaptor 711 comprises, for example, a PTP port Identity (as defined in IEEE1588-2008), information mapping information relating to which lower layer transport technology is used (for example LAG or MC-LAG), or information relating to peer ports located on other line card modules. Furthermore, the Unified PTP Transport Adaptor 711 may also be configured to gather local PTP port status information, including information relating to whether a PTP port is active or inactive, as well as information relating to the current designated physical port that is being used to communicate with a Master/Slave network entity.

The PTP port mapping table 712 stores mapping information for PTP ports of the network entity. The example embodiment of FIG. 7 shows a network entity 701 having only a single line card. However, for a network entity comprising multiple line cards, for example a modular system, the PTP port mapping table 712 also stores mapping information of peer PTP ports (peer PTP ports being PTP ports of other line cards in a modular system). Thus, the PTP port mapping table 712 contains all the PTP ports and relevant mapping information of a network entity 701.

The Unified PTP transport Adaptor 711 can also be configured to check with a data transport module (for example a datacom subsystem) to determine if the PTP port mapping information relates to a LAG or MC-LAG. It is noted that a datacom subsystem is an example of an implementation of a data transport module that manages data switching functions relating to different forms of data transport, for example LAG, MC-LAG, IP or Ethernet.

The operation of the Unified PTP Transport Adaptor 711 can differ depending on a particular application. For example, if a PTP port is mapping to LAG/MC-LAG, then the Unified PTP Transport Adaptor 711 is configured to trigger the Path Consistency Handler 710 to adapt and ensure that PTP messages traverse the same path.

As described above, aspects of the invention ensure link consistency when only one side of the Mater/Slave deploys this function of ensuring that timestamp messages traverse the same link or path, and ensures a reliable link selection when both master and slave deploy this function.

To facilitate this a signaling mechanism is provided for sending a notification signal, as mentioned earlier in the application, from one network entity to another, the signaling mechanism preventing an undesirable loop or swing in the designated port between the master and slave network entities. In other words, the notification signal is used to ensure that the master and slave nodes do not constantly change the link being used as the common or consistent link for communicating messages, such as timestamp messages, which might otherwise occur if such a notification signal was not utilized.

Embodiments of the invention prevent such an undesirable swing by using a signaling mechanism to solve this issue, for example using a 1588 signaling message as the notification signal, for example a time length value (TLV) message such as a "Time Message path Consistency Notification" message.

According to one embodiment the signaling mechanism is configured such that a slave network entity adapts the operation of a master network entity. As such, following a status change, such as a link failure, to at least one of the plurality of communication links between the first network entity and the second network entity, it is the slave network entity that first attempts to determine the link over which a PTP message is received, and then designate that link as the link for sending a second PTP message to the second network entity. In this way an attempt is made to process the information at the slave node (which is typically less busy than a master network entity), and only if the slave network entity is not capable of determining the designated link to use does a master network entity attempt to perform this operation.

Thus, for a slave network entity that has this function installed and enabled, when there is any LAG status change the slave network entity will send a notification signal (such as the Time Message path Consistency Notification message) to the second network entity, informing the second network entity that it will be determining the designated port to use (by following the procedures outlined above to determine the link that is to be used for exchanging messages).

For a master network entity that has this function installed and enabled, when there is a status change to at least one of the communication links connecting the slave network entity and the master network entity, for example a LAG status change caused by a link failure, the master network entity will wait for a specific time period. If a notification is not received within this predetermined time period (no Time Message path Consistency Notification message received), the master network entity will follow the above process to determine the link that is to be used as the designated link or interface for communicating PTP messages. In some aspects, the master network entity will assume that the slave network entity is not configured with a functional consistency module according to an example of the invention. If a Time Message path Consistency Notification message is received, the master network entity does nothing in this respect (i.e. does not perform any steps to determine which link should be used).

According to above description, the embodiments of the invention provide a method of improving the packet based time and phase distribution performance. The embodiments eliminate the influence on PTP performance caused by inconsistency in the timestamp message path.

Figure 8:
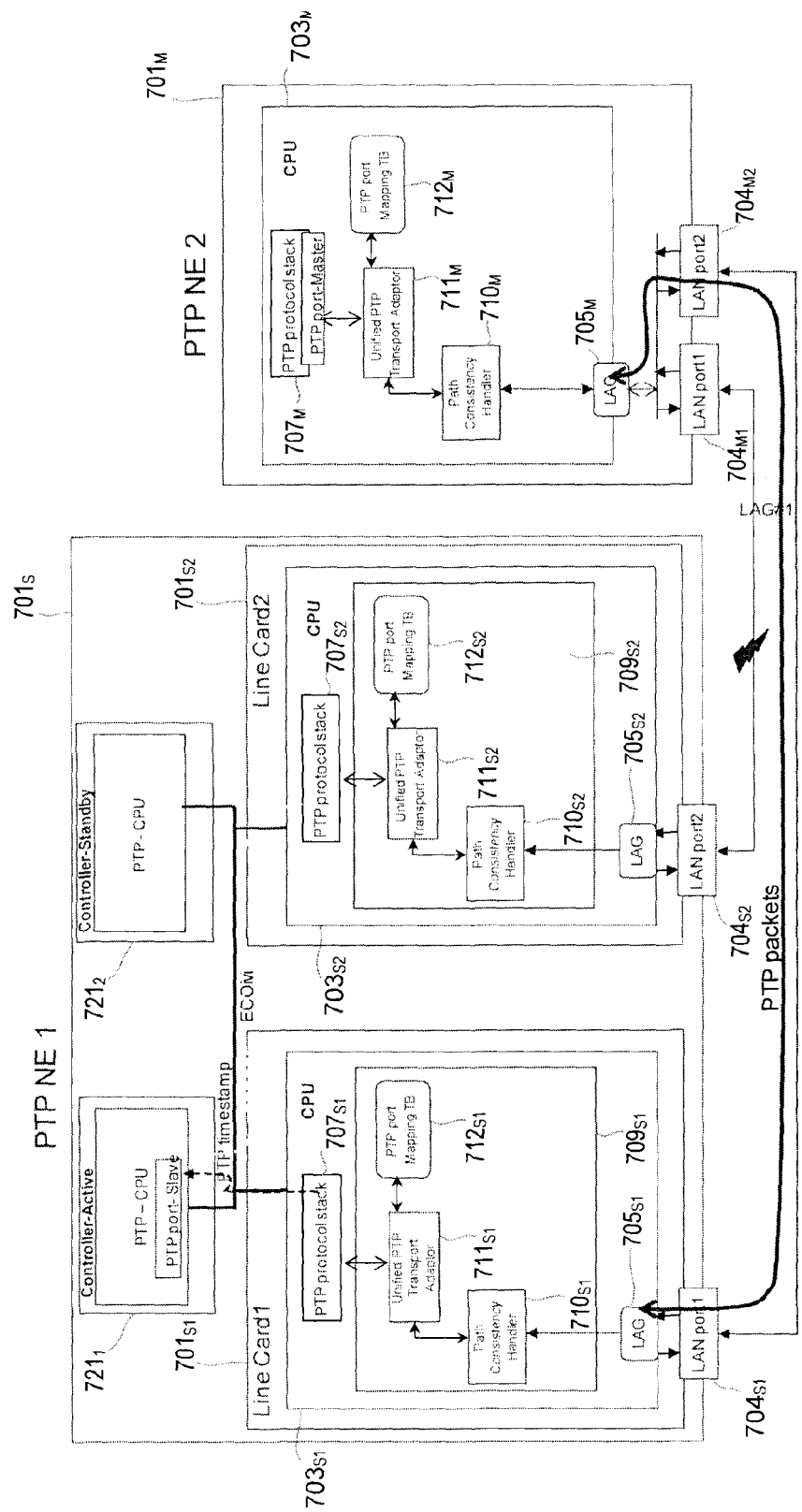
FIG. 8 shows an example of connected network entities according to an embodiment of the invention.

FIG. 8 shows a typical application of an embodiment of the invention, and in particular relating to an application in which PTP messages are communicated over a LAG, and whereby a link failure occurs.

FIG. 8 shows a first network entity in the form of a slave node $701_S$ and a second network entity in the form of a master node $701_M$. The master node $701_M$ comprises a processing unit $703_M$, and a plurality of ports, first and second port $704_{M1}$ and $704_{M2}$ in the example. The processing unit $703_M$ comprises a LAG functional unit $705_M$, a PTP protocol stack $707_M$, a Path Consistency Handler $710_M$, a Unified PTP transport Adaptor $711_M$, and a PTP port Mapping Table $712_M$, all as described in further detail in FIG. 7 above.

The slave node $701_S$ is shown as comprising a modular architecture having first and second line cards $701_{S1}$ and $701_{S2}$, each controllable by one of a control unit $721_1$ and $721_2$, with each line card $701_{S1}$ and $701_{S2}$ configured to communicate via respective LAN ports $704_{S1}$ and $704_{S2}$. Each line card $701_{S1}$ and $701_{S2}$ comprises a respective processing unit $703_{S1}$, $703_{S2}$ Each processor unit $703_{S1}$, $703_{S2}$ comprises a respective LAG functional unit $705_{S1}$, $705_{S2}$, a synchronization (e.g. PTP) protocol stack $707_{S1}$, $707_{S2}$, a consistency module $709_{S1}$, $709_{S2}$ comprising: a Path Consistency Handler $710_{S1}$, $710_{S2}$, a Unified PTP transport Adaptor $711_{S1}$, $711_{S2}$, and a PTP port Mapping Table $712_{S1}$, $712_{S2}$, again all as described in further detail in FIG. 7 above. It is noted that a slave node $701_S$ or a master node $701_M$ may comprise a different number of lines cards than that shown in FIG. 8, or a different number of ports per network entity and/or line card.

The link aggregate group (LAG #1 in this example comprises a plurality of links between the slave node $701_S$ and the master node $701_M$. For example, a first link is shown between LAN port $704_{S1}$ of the slave node $701_S$ and the LAN port $704_{M2}$ of the master node $704_M$, with a second link provided between LAN port $704_{S2}$ of the slave node $701_S$ and LAN port $704_{M1}$ of the master node $701_M$. It is noted that any number of links may be provided.

Assume that the active link of LAG #1 between the slave node $701_S$ and the master node $701_M$ is initially via the second link between LAN port $704_{S2}$ of the slave node $701_S$ and LAN port $704_{M1}$ of the master node $701_M$.

Then, assume that there is a failure of the active link of LAG #1, and that a new link needs to be selected for a timestamp message.

Following a failure of the link between LAN port $704_{S2}$ and LAN port $704_{M1}$, all traffic will be re-located to another link in this LAG #1 group, which in this example means re-locating traffic to the first link between LAN port $704_{S1}$ of the slave node $701_S$ and the LAN port $704_{M2}$ of the master node $704_M$.

In response, the processing unit $703_M$ of the master node $701_M$ will detect the change in status of the communication link between the two nodes, i.e. due to the link failure. The change in status is detected by the Path Consistency Handler $710_M$, which as explained above in relation to FIG. 7 monitors any changes to the member links of the LAG. The Path Consistency Handler $710_M$ acquires the link member change in LAG #1 and, since this network entity is acting as a master PTP port, it will wait a predetermined period to determine whether or not a notification signal, such as a Time Message path Consistency Notification message, is received from the slave node $701_S$.

In this example, since the line cards of the slave node $701_S$ also have the path consistency functions installed, the notification signal will be received (as explained below), which means that the master node $701_M$ will not perform the main task of determining which link to use as the new consistent path for exchanging timestamp messages.

However, the master node $701_M$, upon receipt of the Time Message path Consistency Notification message, will determine which link the message was received on, for example from the ingress interface this message was received on, or form information contained within the Time Message path Consistency Notification. In this example the Time Message Path Consistency Notification message will be received over the LAN port $704_{M2}$, which will be the new up-to-date PTP message transmitting interface. The processing unit $703_M$ is therefore configured to update the information in PTP port Mapping Table $712_M$ accordingly, such that the LAN port $704_{M2}$ is listed as being the PTP port for communicating with the slave node $701_S$.

Next, the steps performed on the slave node $701_S$ will be described, following a failure of the link between LAN port $704_{S2}$ and LAN port $704_{M1}$.

First, the Path Consistency Handler $710_{S2}$ of the second line card $701_{S2}$ determines that there has been a link member change in LAG #1 on the second line card $701_{S2}$. Since this PTP port is acting as a slave node, it will immediately ask peer PTP ports, such as the first line card $701_{S1}$ in this example, to send out a Time Message path Consistency Notification message to the master node. The communication with peer line cards may be carried out via the controllers $721_2$ and $721_1$, or via direct communication between the processing unit of line card modules 701.

In an application where there are more than two line cards, each of the other line cards will send a Time Message Path Consistency Notification to the master. Each peer port on each line card can send a message. Thus, there may be only a single notification signal if only one physical port on a line card belongs or maps to this peer port, or many messages if multiple physical ports on a line card belong or map to this peer port.

When the master node receives a Time Message path Consistency Notification, i.e. from one of a possible multiple line cards or ports of the slave node that has not failed, the master will determine which ingress port that message was received on, and then designate that port as the port to use for future communication with the slave node. In this respect the master will act upon the first Time Message path Consistency Notification message that it receives (even though it may receive subsequent or multiple notification signals).

Then, because the master node has "picked" which link to use, when the slave node receives the next message from the master node, it is that message that it uses to captures the link (port) information, and assigns that link (port) as the port to use for subsequent communications.

As such, a slave node may be configured to send a notification signal to a master node before performing the steps of determining which link to use for communicating timestamp messages with the master node, that is before receiving a first message, determining the link over which the first message was received, and based on the determination sending a second message to the master node over the same link.

Then, the Path Consistency Handler $710_{S1}$ of the first line card $701_{S1}$ captures that LAN port $704_{S1}$ can receive the PTP message from the second network entity $701_M$.

Meanwhile, the Path Consistency Handler $710_{S1}$ of the first line card $701_{S1}$ also captures that the egress PTP message from the master node $701_M$ to the slave node $701_S$ is via LAN port $704_{S1}$.

On the second line card $701_{S2}$, the Unified PTP Transport Adaptor unit $711_{S2}$ sets the PTP port corresponding to LAN port $704_{S2}$ to be "inactive" in its local PTP port Mapping Table $712_{S2}$.

On the first line card $701_{S1}$, the Unified PTP Transport Adaptor unit $711_{S1}$ sets the PTP port corresponding to LAN port $704_{S1}$ to be "active" in its local PTP port Mapping Table $712_{S1}$. The Unified PTP Transport Adaptor unit $711_{S1}$ also records that the new designate interface is LAN port $704_{S1}$ into its local PTP port Mapping Table $712_{S1}$.

As a consequence of the procedures outlined above, all the PTP messages transmitted/received by the slave node $701_S$ (slave PTP port) to the master node $701_M$ (master PTP port) will use the LAN port $704_{S1}$.

It can be seen from the above that a new PTP message path between the slave node $701_S$ (the first network entity) and the master node $701_M$ (the second network entity) is re-built, and that a consistent path is established for communicating messages, thereby avoiding synchronization issues caused by timestamp messages being delivered over different paths or links.

In the event that the master node $701_M$ did not receive the Time Message path Consistency Notification message, then the master node $701_M$ would need to perform the steps of determining which link should be designated as the new link for communicating between the two network entities.

Although the embodiment of FIG. 8 has been shown as having two line card modules in the slave node, and one in the master node, it is noted that both the slave and master nodes may comprise any number of line card modules.

If both the master $701_M$ and slave $701_S$ nodes attempted to activate the path consistency handler, there would be a potential issue that each side would try to adapt the other, resulting in a swing on the egress message designated interface. In some aspects, only one of the master and slave $701_S$ transmit a timestamp message based on a received link (port) of a timestamp message. Following a change in the link group, the master awaits the notification signal from the slave. If the notification signal is received, this indicates that both master and slave have the consistency function according to aspects of the present invention. In this case, the master uses the link on which the notification message was (first) received to send the first timestamp message, instead of using the link of a received timestamp. The slave $701_S$ transmits the second timestamp message on the same link as the first timestamp message was received. In some aspects, the slave $701_S$ always transmits the second timestamp message on the same link as the first timestamp message was received. In some aspects, only one of the slave and master always transmits the second timestamp message on the same link as the first timestamp message was received, the other of the slave and master is either not configured with the consistency function or determines a link based on the notification message instead of the timestamp message.

If the master $701_M$ does not receive the notification signal, the master functions to transmit the second timestamp message on the same link as the first timestamp message was received from the slave. Since the slave does not have the consistency function, the first timestamp from the slave will be sent on a link determined by the resiliency mechanism. The master adapts to this and uses the same link in response. In this case, only one of the master and slave (i.e. master) functions to specify transmission of the second timestamp message on the same link as the first timestamp message was received from the slave. The other of the master and slave (i.e. slave) is using the same link, but this link is specified or determined by the link resiliency mechanism (e.g. hash function) or other function. The link resiliency mechanism or other function does not itself intend, or does not reliably, transmit the timestamps on the same link in both directions.

If only the slave, and not the master $701_M$, comprises the consistency function according to examples of the invention, the slave functions as described above. In particular, the slave transmits the second timestamp message on the same link as the first timestamp message was received from the master. As described above for the slave, the link selected by the master is specified or determined by the link resiliency mechanism or other function, which itself does not reliably transmit the timestamps on the same link in both directions.

Figure 9:
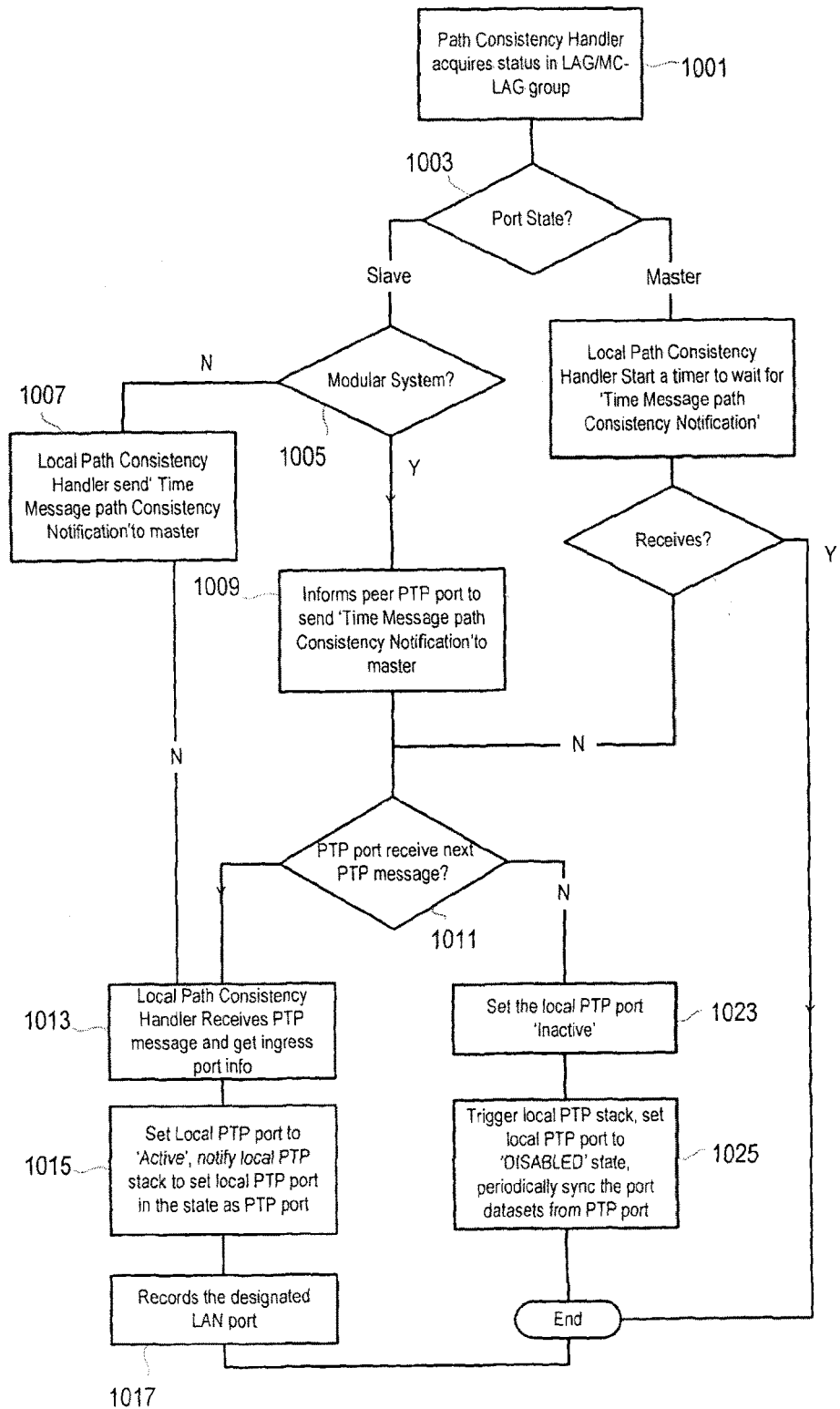
FIG. 9 shows a method according to another embodiment of the invention.

FIG. 9 shows the steps performed by another embodiment of the present invention.

In step 1001 a Path Consistency Handler 710 acquires the status of a LAG or MC-LAG. This may involve determining if there has been a change in status of the LAG or MC-LAG, for example a failure of one of the links.

Different operations are performed depending upon whether a particular network entity is acting as a master node or a slave node. Therefore, in step 1003 the port state is determined. The port state is determined since the port state may differ from a node state according to the PTP protocol. For example, the PTP protocol may comprise a clock mode known as a Boundary Clock, BC, of PTP. The Boundary Clock is a combination of PTP Slave and PTP Masters. Since a PTP Slave is only one network entity and facing upstream, and that there may be many PTP Master network entities facing downstream, then the PTP Master/PTP Slave is per "PTP port" instead of a node. If a node utilizes an Ordinary Clock, OC, of PTP, then there is only one 'PTP port', such that the port state is then the same as node state.

If acting as a slave node, further actions performed at the slave node depend upon whether or not the slave node is a modular system having multiple line cards, or a non-modular system having a single line card. Thus, in step 1005 it is determined whether the network entity is a modular system.

If not, in step 1007 the local Path Consistency handler 710 will send a notification signal, such as a Time Message path Consistency Notification message to a master node.

Then, in step 1013, the local Path Consistency Handler will receive a next PTP message and determine the ingress port information, as described in the embodiments above, in order to determine over which link the PTP message was received. The local Path Consistency Handler sets the determined local PTP port to an "active state", and notifies the local PTP stack to set the local PTP port to a state which indicates that it is the PTP port to be used for communicating messages. The designated port (for example LAN port) is then recorded, for example by storing in the local PTP port mapping table, step 1017. The network entity is then able to communicate PTP messages via this designated port.

If it is determined in step 1005 that the network entity is a modular system, then in step 1009 the Path Consistency Handler 710 informs a peer PTP port or multiple PTP ports (a peer PTP port being a port from the same line card or a peer line card) to send a notification signal (the Time Message path Consistency Notification message) to the master network entity.

Then, it is determined in step 1011 whether or not the PTP port receives the next PTP message. If not, the local PTP port is set as being inactive, step 1023. It is noted that this step may be performed in a situation where step 1009 might have informed multiple peer ports to send Time Message path Consistency Notification messages to the master, and whereby the master acts upon the first notification signal it receives, such that one or more of the multiple peer ports will not then receive the next PTP message in step 1011, hence branching to step 1023. The local PTP stack is then triggered in step 1025, to set the local PTP port to a "DISABLED" state. The port datasets (port information) may be periodically synchronized, such that any change in status to a particular port is updated.

If it is determined in step 1011 that the PTP port does receive the next PTP message, then the steps described above for steps 1013, 1015 and 1017 are performed. In step 1013 the local Path Consistency Handler that has received the next PTP message will determine the ingress port information in order to determine over which link the PTP message was received. The local Path Consistency Handler sets the determined local PTP port to an "active state", step 1015, and notifies the local PTP stack to set the local PTP port to a state which indicates that it is the PTP port to be used for communicating messages. The designated port (for example LAN port) is then recorded, for example by storing in the local PTP port mapping table, step 1017. The network entity is then able to communicate PTP messages via this designated port.

The embodiments of the invention as described above have the advantage of reducing or eliminating the influence on PTP performance caused by PTP timestamp message path inconsistency, due to paths being changed due to mechanisms such as diversity resiliency mechanisms, e.g. LAG/MC-LAG.

The embodiments of the invention provide a new functionality performed by a processing unit that includes a Path Consistency Handler, which can flexibly or dynamically adapt a resiliency function (LAG) change to secure the timestamp messages traverse the same path or link.

The embodiments of the invention described above thus provide a method and apparatus which help reduce or eliminate the influence on timing messages, for example in the performance of network employing a two-way timestamp exchange such as precision time protocol, PTP, caused by inconsistency in a timestamp message path.

According to another aspect of the invention, there is provided a method in a first network entity which is capable of communicating over a plurality of communication links with a second network entity using a precision time protocol, PTP. The method comprises the steps of detecting a change in the status of at least one of the plurality of communication links between the first network entity and the second network entity, and, in response thereto: receiving a first PTP timestamp message; determining which port the first PTP timestamp message was received via, the port being one of a plurality of ports of the first network entity; and transmitting a second PTP timestamp message via the determined port.

In such an embodiment where the plurality of ports of the first network entity are provided on a single line card of the first network entity, the method comprises the step of storing port interface information in a mapping table of the single line card. Alternatively, in an embodiment where the plurality of ports of the first network entity are distributed over two or more line cards of the first network entity, and wherein the port interface information is stored in a respective mapping table of each of the two or more line cards.

According to another aspect there is provided a network entity which is capable of communicating over a plurality of communication links with a second network entity using a precision time protocol, PTP. The network entity comprises a plurality of ports for communicating with the second network entity via the plurality of communication links; and a processing unit configured to: detect a change in the status of at least one of the plurality of communication links between the network entity and the second network entity, and in response thereto: determine which port a first PTP timestamp message is received via; and control a second PTP timestamp message to be transmitted to the second network entity via the determined port.

Typical applications of embodiments of the invention include PTP over LAG in the case of link failure. It can be seen from the embodiments above that timestamp messages such as PTP timestamp messages may be transmitted over a consistent link or path, but also other PTP messages.

The term 'link aggregation group' may be used generally to refer to any system including link aggregation, for example, LAG and MC-LAG.

The described handling of the two-way timestamp exchange protocol described is independent of the handling of the remainder of the traffic between the network entities. The issue of selection of a link in a link aggregation group for the remainder of the traffic is considered as separate to the highly time dependent requirements of the synchronization protocol described, e.g. PTP.

The embodiments above describe that the master node awaits receipt of the notification signal from the slave node, and functions differently as described according to whether the notification signal is received. Alternatively, the notification signal is transmitted by the master node to the slave node. The slave node functions differently as described according to whether the notification signal is received.

Aspects of the present invention comprise a computer program or computer program product, configured to run on a computer or processing unit of a network entity, to carry out at least some of the functions described.

Aspects of the invention describe a network entity (e.g. slave) transmitting a timestamp message using the same link/port as a timestamp message was received. In other aspects, a network entity (e.g. slave) is configured to transmit a timestamp message using the same link/port as a message was received. The received message is a message of the two-way timestamp exchange protocol, and may or may not comprise an actual timestamp. In particular, the link/node is selected according to a signaling message (e.g. notification message) of the protocol and/or a timestamp message.

It should be noted that the above-mentioned embodiments illustrate rather than limit the invention, and that those skilled in the art will be able to design many alternative embodiments without departing from the scope of the appended claims. The word "comprising" does not exclude the presence of elements or steps other than those listed in a claim, "a" or "an" does not exclude a plurality, and a single processor or other unit may fulfill the functions of several units recited in the claims. Any reference signs in the claims shall not be construed so as to limit their scope.

The invention claimed is:

1. A method in a first network entity which is capable of communicating over a plurality of communication links with a second network entity using a two-way timestamp exchange, the method comprising the steps of:
    transmitting a notification signal to the second network entity for informing the second network entity that the first network entity is configured to specify receiving and transmitting timestamp messages via a same link;
    after transmitting the notification signal:
        receiving at the first network entity a first timestamp message of the two-way timestamp exchange protocol from the second network entity;
        determining on which link the first timestamp message was received; and
        based on the determination of the link, transmitting from the first network entity a second timestamp message to the second network entity on the determined link.

2. A method as claimed in claim 1, wherein the notification signal indicates the same link for receiving and transmitting timestamp messages.

3. A method as claimed in claim 1, the method further comprising:
    determining that the second network entity is not configured to specify receiving and transmitting timestamp messages via a same link, and subsequently, transmitting the second timestamp message to the second network entity on the same link as the first timestamp message was received.

4. A method as claimed in claim 1, the method further comprising;
    determining that the second network entity is configured to specify receiving and transmitting timestamp messages via a same link, and subsequently, the first network entity transmits a first timestamp message on a determined link prior to receipt of a timestamp message from the second network entity.

5. A method as claimed in claim 1, wherein the first network entity comprises a master node and the second network entity comprises a slave node, the method comprising:
    determining that the slave node is not configured to specify receiving and transmitting timestamp messages via a same link, and subsequently, transmitting the second timestamp message to the slave node on the same link as the first timestamp message was received from the slave node.

6. A method as claimed in claim 1, wherein the first network entity comprises a slave node and the second network entity comprises a slave node.

7. A method as claimed in claim 1, wherein the determining step is performed in response to detecting a change in the status of at least one of the plurality of communication links between the first network entity and the second network entity.

8. A method as claimed in claim 7, wherein a change in status comprises:
    a change of communication link resulting from a resiliency diversity mechanism that is configured to control the plurality of communication links; and/or
    a failure of one or more links of the plurality of communication links that constitute a link aggregation group, LAG, or a multi-chassis link aggregation group, MC-LAG, between the first network entity and the second network entity; or
    a change to the communication links that constitute a link aggregation group, LAG, or a multi-chassis link aggregation group, MC-LAG, between the first network entity and second network entity.

9. A method as claimed in claim 1, wherein the plurality of communication links form at least one of a resiliency diversity mechanism and a link aggregation group.

10. A method as claimed in claim 1, wherein the two-way timestamp exchange is part of a precision time protocol, PTP.

11. A computer program product comprising instructions stored on non-transient computer-readable media which, when executed by a processor, perform the steps of claim 1.

12. A method in a second network entity which is configured to communicate over a plurality of communication links with a first network entity using a two-way timestamp exchange, the method comprising the steps of:
    detecting a change in the status of at least one of the plurality of communication links between the second network entity and the first network entity, and, in response thereto:
        determining whether a notification signal is received from the first network entity within a predefined period, the notification signal informing the second network entity that the first network entity will be receiving and transmitting timestamp messages via the same link, and, in the event that the notification signal is not received within the predetermined period:
            receiving at the second network entity first timestamp message from the first network entity;
            determining on which link the first timestamp message was received; and
            based on the determination of the link, transmitting from the second network entity a second timestamp message to the first network entity on the determined link.

13. A method as claimed in claim 12 whereby, in response to a notification signal being received within the predefined period, the method comprises the steps of:
    determining on which link the notification signal was received; and
    using this link for subsequent communication of timestamp messages with the first network entity.

14. A network entity which is capable of communicating over a plurality of communication links with a second network entity using a two-way timestamp exchange, the network entity comprising:
    a receiver;
    a transmitter; and
    a processor configured to:
        cause a notification signal to be transmitted to the second network entity for informing the second network entity that the first network entity is configured to specify receiving and transmitting timestamp messages via a same link:
after causing the notification signal to be transmitted:
determine on which link a first timestamp message is received from the second network entity; and
based on the determination of the link, transmit from the network entity a second timestamp message to the second network entity on the determined link.

15. A network entity as claimed in claim 14, wherein the processor is further configured to determine the link in response to detecting a change in the status of at least one of the plurality of communication links between the network entity and the second network entity.

16. A network entity as claimed in claim 14, wherein the plurality of communication links constitute a link aggregation group or wherein the two-way timestamp exchange constitutes part of a precision time protocol, PTP.

17. A network entity which is capable of communicating over a plurality of communication links with another network entity using a two-way timestamp exchange, the network entity comprising:
a receiver;
a transmitter; and
a processor configured to:
detect a change in the status of at least one of the plurality of communication links, and, in response thereto:
determine whether a notification signal is received from the another network entity within a predefined period, the notification signal informing the network entity that the another network entity will be receiving and transmitting timestamp messages via the same link; and wherein, in the event that the notification signal is not received within the predetermined period the processor being further configured to:
determine on which link a first timestamp message is received; and
based on the determination of the link, transmit from the network entity a second timestamp message to the another network entity on the same link.

18. A network entity as claimed in claim 17 whereby, in response to a notification signal being received within the predefined period, the processor is configured to:
determine on which link the notification signal was received; and use this link for subsequent communication of timestamp messages with the another network entity.

19. A system comprising a first network entity and a second network entity capable of communicating over a plurality of communication links using a two-way timestamp exchange,
wherein the first network entity comprises a first processor configured to:
detect a change in the status of at least one of the plurality of communication links, and, in response thereto:
transmit a notification signal to the second network entity configured to inform the second network entity that the first network entity is configured to specify receiving and transmitting timestamp messages via the same link,
wherein the second network entity comprises a second processor configured to:
detect a change in the status of at least one of the plurality of communication links, and, in response thereto:
determine whether a notification signal is received from the first network entity within a predefined period, the notification signal informing the second network entity that the first network. entity is configured to specify receiving and transmitting timestamp messages via the same link; and wherein,
in the event that the notification signal is received by the second network entity within the predetermined period the second processor being further configured to:
determine on which link the notification signal was received; and
use the determined link for subsequent communication of timestamp messages with the first network entity.

20. The system as claimed in claim 19 wherein the first processor is further configured to:
determine on which link a first timestamp message was received from the second network entity;
and
based on the determination of the link, transmit from the first network entity a second timestamp message to the second network entity on the same link as the first timestamp was received.

* * * * *